United States Patent [19]

Haines

[11] 3,934,353
[45] Jan. 27, 1976

[54] SURVEYING INSTRUMENT

[76] Inventor: David C. Haines, 107 "B" St., Salt Lake City, Utah 84103

[22] Filed: Sept. 19, 1974

[21] Appl. No.: 507,474

[52] U.S. Cl. .................................. 33/262; 33/277
[51] Int. Cl.² ....................................... G01C 15/00
[58] Field of Search ............. 33/262, 282, 277, 285, 33/227

[56] References Cited
UNITED STATES PATENTS

| | | | |
|---|---|---|---|
| 1,336,010 | 4/1920 | Wingate | 33/285 |
| 1,455,347 | 5/1923 | Merritt | 33/277 X |
| 1,723,456 | 8/1929 | Zak | 33/277 X |
| 2,519,727 | 8/1950 | Yezdan | 33/277 |
| 2,562,241 | 7/1951 | Picard | 33/277 |

Primary Examiner—William D. Martin, Jr.
Attorney, Agent, or Firm—Mallinckrodt & Mallinckrodt

[57] ABSTRACT

This invention relates to surveying instruments of the type by means of which measurements relating to deviation from a true level line, distance, vertical angles, linear alignment of points at various elevations, horizontal angles and the like may be obtained. The instrument comprises a rigid transparent plate or plates containing a mirrored reflection surface. The plate is suspended from a point on the vertical axis through the center of gravity of said plate, and a hairline extends across said plate and mirrored reflection surface in a direction perpendicular to the vertical suspension axis. A set of calibrated marks and a vertical datum line coinciding with or parallel to the vertical suspension axis are imprinted on the plate above and below the hairline. The hairline acts as a horizontal datum line and is used together with the calibrated marks and vertical datum line to determine relative measurements of level, distance, vertical angles, linear alignment and horizontal angles by direct observation or sighting through the instrument.

6 Claims, 8 Drawing Figures

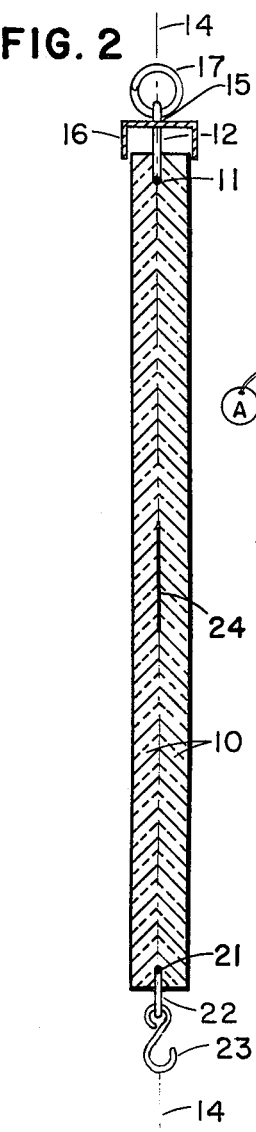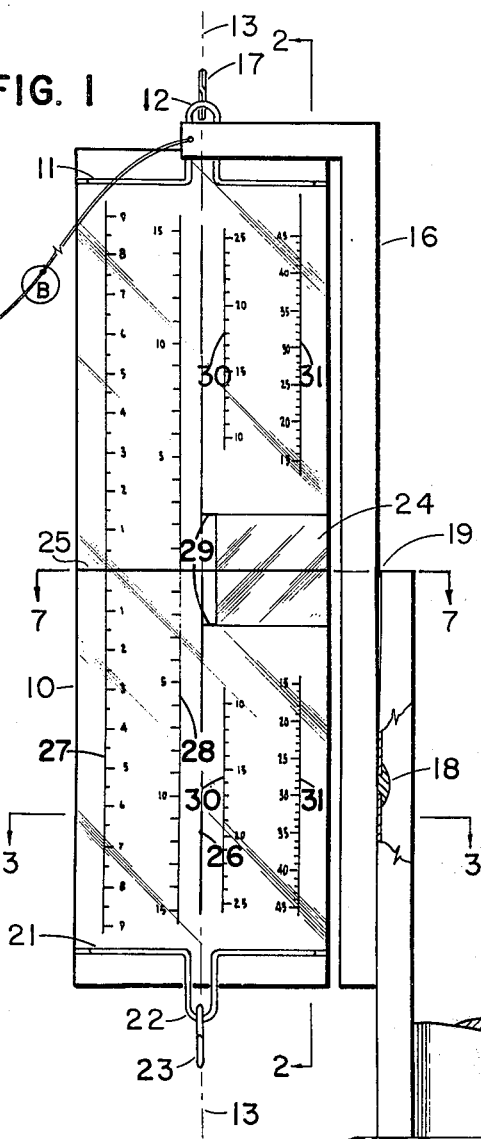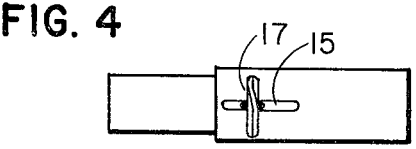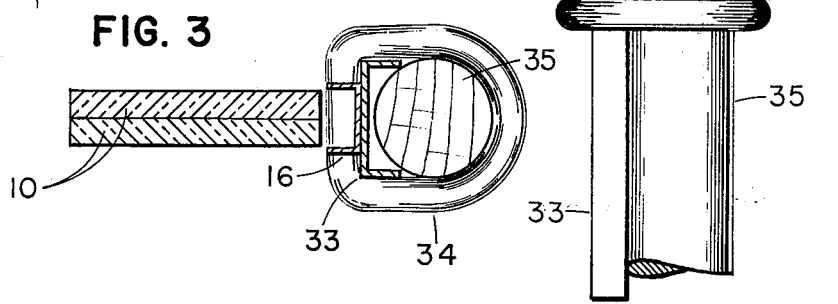

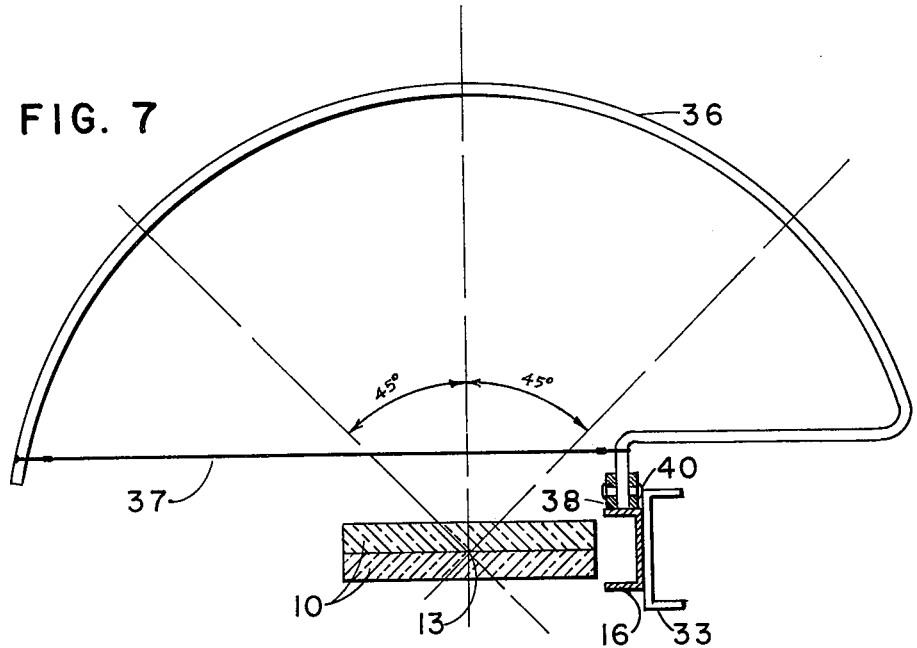
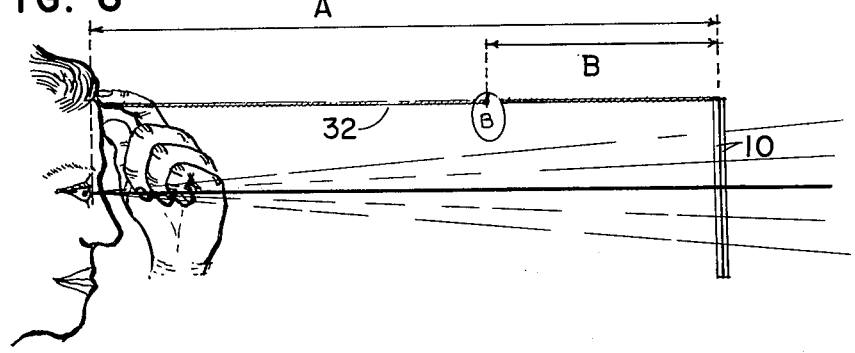
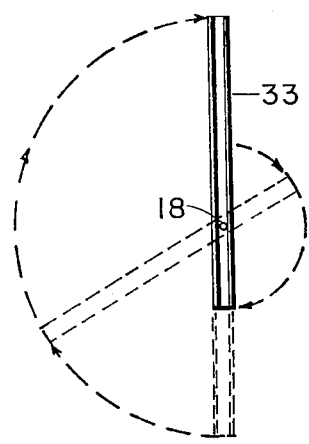
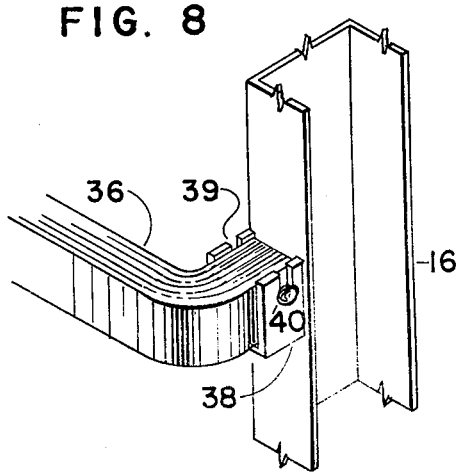

SURVEYING INSTRUMENT

BACKGROUND OF THE INVENTION

1. Field:

The invention is in the field of surveying instruments providing means of field measurements used in civil engineering, geology, mineral exploration, highway and building construction, reconnaissance surveying, slope staking, building construction, and preliminary layout of land utilization planning and the like.

2. State of the Art:

In the field of surveying, precision instruments are available for making land measurements. These instruments are generally complicated in their operation as well as being expensive. These instruments also require careful handling, expert operation and accurate adjustment for leveling of the instrument itself before use at each observation station. Large organizations specializing in precise field engineering can justify the expense of these precision instruments and the skilled operatives to use them properly.

Small organizations and individuals closely related to construction, engineering, land planning and the like have a need for an uncomplicated, inexpensive instrument to accomplish the same functions but without the need for the same degree of accuracy. Although several different instruments have been proposed for measuring distance, angles, elevations, etc., a really practical, inexpensive instrument having wide diversity of functions and simplicity of operation has not been developed heretofore.

The so-called "hand level" has been widely used, even though it has a low degree of accurace, is difficult to use, and performs only the single function of leveling. The hand level generally comprises a bubble tube level mounted on top of a short scope in which a prism is mounted so that the user observes a split image, one being the fluid level, the other being the target point in the distance. Readings on the target must be taken at the precise moment that the bubble is centered in the fluid level image. This instrument being hand held by the observer and utilizing a short fluid tube has inherently, a low degree of accuracy even when operated by a steady hand and skilled observer.

Improvements are available in this type of instrument allowing it to be preadjusted to view along an inclined alignment by means of the fluid level mounted above the scope on a protractor or quadrent allowing the scope to be aimed up or down at predetermined vertical angle, but the instrument must be readjusted before a level reading or different angle observation can be taken.

In U.S. Pat. No. 2,407,416 there is shown a leveling device comprising a flat weighted mirror having a horizontal datum line inscribed thereon. The mirror is mounted on a trunnion pin for pivoting movement about a horizontal axis pendulum fashion. The trunnion pin and mirror are contained in a housing and means are provided for adjusting the setting of the mirror. The housing is supported on a tripod. In use, the device is set up vertically on its tripod. The user peers through the device with one eye so that this eye is reflected in the mirror with the pupil bisected by the datum line. On sighting past the mirror over the top of the trunnion pin, the object observed in line with the top side of the trunnion pin at the same level as the trunnion pin.

SUMMARY OF THE INVENTION

In accordance with the present invention, a surveying instrument of unique design enables essentially all of the functions required in reconnaissance surveying, slope staking, building construction, land planning, and the like to be performed with one instrument, and at the same time doing so with greater accuracy, diversity, simplicity of adjustment and operation economy of equipment and operating personnel, than has been possible with instruments now available.

The instrument comprises a transparent plate suspended from a point on the vertical axis through the center of gravity of the plate. The plate advantageously comprises two flat, transparent members which are integrally attached along a common side with suspension means embedded between the two members and extending from the top of the so-formed plate. A hairline extends across the plate so as to be perpendicular to the vertical axis through the center of gravity of the plate, and a mirrored surface is located on the plate so as to be in a vertical plane which is parallel to the above-mentioned vertical axis. The hairline extends across said mirror whereby when the instrument is suspended so that a person can observe the pupil of his eye in the mirror, and the reflection of his pupil is bisected by the hairline, then distant objects observed through the transparent plate which appear to be in alignment with the hairline are located on the same level as the hairline or the pupil of the person's eye.

An advantageous feature of the invention is the inclusion of a set of calibrated marks or gauges on the plate enabling the operator to sight through the plate and observe relative measurements corresponding to various target points within the geometric field of vision of the instrument, thus avoiding the necessity of readjusting the instrument for each sighting.

It is a unique feature of the invention that by the very nature of its design, use, and construction, the instrument is inherently and automatically level for each sighting without requiring time-consuming adjustments as is required by more expensive and complicated instruments. The automatic leveling feature is accomplished by virtue of the transparent plate or plates being suspended from a point on the vertical axis through the center of gravity of the plate or plates. Optionally, a plumb bob can be suspended from the bottom of the instrument on the same axis. The mirrored reflecting surface is positioned on or imbedded in the plate or plates so that it is in a vertical plane which is parallel to said vertical axis, and, the ray of light which is reflected from the mirrored surface and appears as an image on the horizontal cross hair is an exact level line being perpendicular to the gravitationally vertical axis of the transparent plate or plates. For preliminary estimating or reconnaissance surveying and the type of work for which the hand level is used, the instrument may be held by the hand of the operator, without plumb bob or staff. If the observer has a reasonably steady hand, readings by this means would tend to be as accurate or slightly more so than the same operator using the fluid tube hand level. Better accuracy would be obtained by attaching a plumb bob to the bottom of the instrument along a line coincident with said vertical axis. In work requiring more accuracy than the foregoing, the instrument can be mounted on a rod or staff which would alleviate most of the inaccuracies resulting from the unsteadiness of the hand of the operator. For work requiring readings approaching results obtained from the expensive and complicated instruments the staff or rod would be supported by an independent base or tripod and plumb bob could be fluid damped.

In use as a leveling device the instrument should be held or supported at about arms length and at the eye level of the user. Adjustment to the exact eye level of the observer is accomplished by observing the eye in the mirrored reflecting surface and thence bisecting the pupil in the hairline or otherwise called the horizontal datum line. The line of sight thus established between the eye and the horizontal datum line, being exactly perpendicular to the gravitationally plumb line of the instrument will be a true horizontal plane, and all objects which are viewed in this plane are on the same level as the pupil of the observer's eye.

For use in measuring distances, the instrument is held as above but with the further requirement that the eye of the observer must be at predetermined distance from the instrument. This is accomplished by holding the end of a cord, whose other end is attached to the instrument, against the observer's forehead and holding the instrument in such a way that the cord is tight. In this position relative measurements on a target rod observed through the "stadia" gauges or marks imprinted on the instrument are converted in the usual manner to distance measurements to the target location.

For use in measuring the inclination or vertical angle between the datum line and the observed object, the instrument is held as above, at predetermined distance from the eye of the observer. In this position and with the pupil bisected in the mirrored reflecting surface, vertical angles are read through the angular degree gauges imprinted on the instrument. Direct angle measurement may be read to any point above or below the observer which is within the geometric field of vision of the instrument. In addition to degree measurements, the instrument is imprinted to read directly, percentage of slope and ratio of slope, which are common to certain construction, engineering and surveying functions.

For use in measuring as linear alignment and horizontal angles, a protractor is attached to the instrument, and the instrument should be supported independently of the observer, such as by an range pole, tripod or like means. These sightings do not require use of the predetermined distance cord. In this position the observer may sight through the gravitationally true vertical datum line to align all points beyond and above or below the observation station which are within the geometric field of vision of the instrument. With this same position and support means, the observer may move his sight point to and frow and while sighting through the vertical datum line reading on the protractor the horizontal angle between target points.

THE DRAWINGS

Embodiments of the surveying instrument representing the best mode presently contemplated of carrying out the invention is actual practice are illustrated in the accompanying drawings, in which:

FIG. 1 is an elevation taken from the point of view of the observer while using the instrument;

FIG. 2 is a vertical section taken on line 2—2 of FIG. 1;

FIG. 3 is a sectional plan taken on line 3—3 of FIG. 1;

FIG. 4 is a plan view looking down on the instrument from above, as it is held when in use;

FIG. 5 is a right side elevation showing the rotatable handle in the carrying position;

FIG. 6 is a side view of the instrument and a person using the predetermined distance cord;

FIG. 7 is a sectional plan taken along line 7—7 of FIG. 1 showing the instrument with the optional protractor attachment for measuring relative horizontal angles between various target points; and FIG. 8 is a partial perspective showing the means for attaching the protractor to the frame of the instrument.

DETAILED DESCRIPTION OF ILLUSTRATED EMBODIMENTS

As illustrated in FIG. 1, the pair of identical vertical rigid transparent plates 10 are integrally attached together along a common side and by means of a flexible metallic cable 12 rabbeted and adhered interiorly in groove 11, between transparent plates 10 with a loop extending upwards along the vertical width axis 13 and thickness axis 14, which coinside. The loop of the cable in turn passes thru slot 15 in the top of open-ended frame 16 and is anchored in position by split ring 17. When carrying the instrument, cable 12 and split ring 17 are moved to the right end of slot 15 which allows the right side of plates 10 to be housed by the open sided channel of frame 16. On the right side of open-ended frame 16, rotatable handle 33 is anchored with rivet 18, held firmly in operative position by spring lever action between crimp 19 in handle 33 and rivet 18.

From the bottom of plates 10, suspended by means of a flexible metallic cable 22 anchored similarly to cable 12 in groove 21 along the vertical width axis 13 and thickness axis 14 which coinside, is a plumb bob hook 23.

Interiorly applied along the thickness axis 14 is a mirrored reflecting surface 24 which is bisected horizontally by the horizontal zero datum line 25.

Imprinted in between the transparent plates 10, along the thickness axis 14, are various datum lines and calibrated marks or gauges as shown on FIG. 1, the vertical datum line 26 being along the width and thickness axis 13 and 14. The horizontal zero datum line 25 is along the horizontal axis line. Vertical angles in degrees are measured on line 27 when the instrument is positioned at a predetermined distance from the user's eye, by holding the free end of cord 32 against the user's forehead while simultaneously holding the instrument away from the user so that the cord is tight (FIG. 6). Vertical angles in percentage of slope are measured on line 28 with the same predetermined distance. Distance measurements are obtained by a ratio of the distance reading on a target rod between the top and bottom "stadia" gauges 29 (FIG. 1). Angles greater than those which can be read on line 27 and 28 are measured when predetermined distance cord 32 length B is used to position the instrument at the corresponding distance from the user's eye, while reading degrees on line 30 and percentage of slope on line 31.

Construction documents often call for slopes such as 4 to 1, 6 to 1 and the like, by this indication is meant thatg the slope should be a ratio of 4 units horizontally for each 1 unit vertically. Since such measurements are most readily converted and are similar to percentage of slope, the gauges for measuring such direct ratio of slope are also imprinted on lines 28 and 31.

The channel handle 33 is so designed that a staff or range pole 35 may be partially recessed, anchored, and used for more accurate measurements by the simple use of a rubber O-ring 34, slightly stretched and rolled into place as shown on FIG. 1 and 3.

The optional, removable protractor 36, for measuring horizontal angles consists of a curvilinear plate having imprinted thereon degree marks or gauges as does a common protractor. On the back right side of frame 16 is permanently attached channel clip 38 with an inside thickness dimension the same as the outside thickness dimension of protractor 36. Channel clip 38 is slotted on each side with slot 39 to receive elongated rivet pin 40 which is permanently embedded in protractor 36. Protractor 36 is stabilized in its true radius position with cable 37 to avoid distortion therein.

The imprinting on plates 10 and the mirrored surface 24 can be positioned on either front or back surface of the combined plates 10 as long as they are in a plane parallel to the vertical axis through the center of gravity of the plates 10.

What I claim is:

1. A simple surveying instrument comprising a transparent plate; means for suspending the transparent plate from a point on a vertical axis through the center of gravity of said plate; a hairline extending across said plate and being perpendicular to said vertical axis; and a mirrored surface positioned on said plate so that the plane of the mirrored surface is parallel to said vertical axis, said hairline extending across said mirrored surface, whereby when said plate is suspended so that a person can observe the pupil of his eye in said mirrored surface, and the reflection of his pupil is bisected by said hairline, then distant objects observed through said transparent plate which appear to be in alignment with said hairline are located in the same level as the pupil of the eye of said person.

2. An instrument according to claim 1, wherein a set of calibrated marks are positioned on said plate above and below said hairline and means are provided for holding the instrument a set distance in front of the person's eye whereby when the person can observe the pupil of his eye in said mirrored surface, and the reflection of his pupil is bisected by said hairline, then the calibrated marks indicate the angle and slope between the hairline and distant objects observed through said transparent plate which appear to be in alignment with the calibrated marks.

3. An instrument according to claim 2 wherein the means for suspending said plate comprises a frame and a cable removably attached at one end thereof to said frame and at the other end thereof to said plate, and the means for holding the instrument a set distance from the person's eye comprises a cord having measured points therealong and having one end thereof attached to said frame whereby the frame is held at a distance away from said vertical s eyes equal to the desired measured distance on said cord.

4. An instrument according to claim 1, wherein the means for suspending said plate comprises a handle and a cable attached at one end thereof to said handle and at the other end thereof to said plate, the handle is attached to a staff or tripod, a protractor having degree markings along the arc thereof is attached to the handle so that it is generally in a horizontal plane, and said plate has a vertical datum line corresponding to said vertical axis, whereby the person can determine the angle between objects which appear to be in alignment with said degree markings and said vertical datum line.

5. An instrument according to claim 1, wherein a vertical datum line extends across said plate is parallel to said vertical axis.

6. An instrument according to claim 1, having means for hanging a plumb bob from the bottom of said plates along a line coincident with said vertical axis.

* * * * *

UNITED STATES PATENT OFFICE
CERTIFICATE OF CORRECTION

PATENT NO. : 3,934,353
DATED : January 27, 1976
INVENTOR(S) : David C. Haines

It is certified that error appears in the above-identified patent and that said Letters Patent are hereby corrected as shown below:

Column 4, Line 64, "thatg" should be —that—.

Column 6, Line 20, "vertical s" should be —person's—.

Signed and Sealed this twenty-ninth Day of June 1976

[SEAL]

Attest:

RUTH C. MASON
*Attesting Officer*

C. MARSHALL DANN
*Commissioner of Patents and Trademarks*